United States Patent [19]

Stopka

[11] 4,176,061

[45] Nov. 27, 1979

[54] APPARATUS AND METHOD FOR TREATMENT OF FLUID WITH OZONE

[76] Inventor: Karel Stopka, 625 Rhode Island, Apt. 3, San Francisco, Calif. 94107

[21] Appl. No.: 883,401

[22] Filed: Mar. 6, 1978

[51] Int. Cl.$^2$ .............................................. C02B 1/38

[52] U.S. Cl. .................................. 210/63 Z; 210/127; 210/192; 210/205

[58] Field of Search ...................... 210/63 Z, 127, 134, 210/177, 192, 205

[56] References Cited

U.S. PATENT DOCUMENTS

| | | | |
|---|---|---|---|
| 3,448,045 | 6/1969 | Hess et al. | 210/63 Z |
| 3,455,803 | 7/1969 | Miller | 210/63 Z |
| 3,998,714 | 12/1976 | Armstrong | 210/63 Z |
| 4,019,983 | 4/1977 | Mandt | 210/63 Z |
| 4,090,960 | 5/1978 | Cooper | 210/63 Z |

FOREIGN PATENT DOCUMENTS

| | | | |
|---|---|---|---|
| 2059859 | 7/1971 | Fed. Rep. of Germany | 210/63 Z |

*Primary Examiner*—Thomas G. Wyse
*Attorney, Agent, or Firm*—Fishman and Van Kirk

[57] ABSTRACT

An apparatus and method for treatment of fluid such as water with ozone. The apparatus comprises an ozonator for providing a gas containing ozone and an aspirator which mixes the gas with water to provide an ozone and water mixture having microbubbles of gas therein. The mixture is then circulated through an elongated treatment conduit having a length of between about 20 and about 40 feet and a diameter less than about 1 inch to allow the gaseous ozone to dissolve in the water. Throughout the length of the conduit the ozone oxidizes impurities in the water and provides water having a relatively high purity. In the method of the present invention a liquid such as water is mixed with ozone and the mixture is then circulated through an elongated treatment conduit to allow for dissolution of the ozone into the water and to provide purified water. The ozonator used to provide ozone is capable of providing a gas having at least about 1.2 weight percent ozone, preferably a gas having an ozone concentration approaching 2 weight percent. Gas having a high concentration of ozone is provided by a novel ozonator comprising a plurality of electrodes connected in series by gas flow lines.

7 Claims, 7 Drawing Figures

APPARATUS AND METHOD FOR TREATMENT OF FLUID WITH OZONE

BACKGROUND OF THE INVENTION (1) Field of the Invention

This invention relates to purifying liquids. More particularly, the invention relates to a method of and an apparatus for purifying drinking water for domestic, office, plant, restaurant, hotel and similar use.

(2) Description of the Prior Art

It is common practice to purify drinking water by addition of chemicals to the water. The most common chemical treatment is by the addition of chlorine to water. However, the use of chlorine has long been questioned. For several decades Western European scientists, such as Torricelli, have believed that continual absorption by the human organism of small quantities of chloring produce diseases such as hardening of the arteries and damage to liver and kidneys. Torricelli, Alfred. Drinking Water Purification. Adv. Chem. Ser. 21:453–465. (1959)

In 1928 Duggeli published a paper questioning the ability of chlorine to function effectively as a bactericide. He concluded that chlorine was a rather slow working bactericide and that either a low temperature of the water or a high percentage of organic matter in the water greatly slowed down the bactericidal action of chlorine. He also reported that small doses of chlorine did not kill bacteria but only paralyzed them thus making possible subsequent return to normal bacterial growth rates. He also found that, in order to obtain an absolutely lethal bactericidal effect with chlorine, a rather high dosage of chlorination must be used. It has also been found that the ability of chlorine to work as a bactericide is highly sensitive to parameters in the water, that is, the length of time the chlorine is in the water, the presence of heavy metals, the pH and the temperature of the water. Thus, for effective sterilization of water, precise and certain conditions must be established in order to obtain the desired results. Travaux de chimie alimentaire et d'hygiene 1926–1928 "Beitrag zur Frage der Wirkung von Chlor auf die Bakterien des Wassers."

More recently, studies have shown that several of the chlorinated hydrocarbons are carcenogenic. EPA Environmental News, EPA Releases Results of National Drinking Water Survey. April 1975. R-89. The United States Environmental Protection Agency's National Survey conducted on potable water in 1975 indicated that chlorinated hydrocarbons, several of them carcenogenic, existed above permissible levels in seventy-nine cities. In only two cities tested were the levels of chlorinated hydrocarbons below the permissible level. Both of these cities used ozone to treat water. Internal Ozone Institute. Press Release: Ozonation produces highest quality U.S. Drinking Water. Apr. 28, 1975.

The ability of ozone to purify drinking water has been appreciated for some time. According to Bringmann, the rate of destruction of bacteria by ozone is 1 to 2 orders of magnitude faster than that of chlorine. (1) Bringmann, G. 1954. Determination of the lethal activity of chlorine and ozone on *E. Coli,* Z. Hyg. Infektionskr. 139: 130–139. (2) Bringmann, G. 1954, Die Wirkung von Ozon auf Organismen des Trinkwassers, (The action of ozone on organisms in water) A. Hyg. Infektionskr. 139: 333–337. Fetner and Ingols have reported that the bacterial action of chlorine is progressive while the bacterial action of ozone is sudden after reaching threshold value. Fetner, R. H., and R. S. Ingols. 1956. A Comparison of the Bactericidal Activity of Ozone and Chlorine Against *Escherichia Coli* at 1°; J. Gen. Microbiol, 15(2): 380–385. Kessel et al have shown that polio virus treated with chlorine to a residual value of 0.5 mg per liter to 1 mg per liter will be rendered inert in 1½–3 hours while treatment with ozone to a residual value of 0.045 to 0.45 mg per liter will render polio viruses inert in only two minutes. Kessel, J. F., D. K. Allison, F. J. Moore, and M. Kaime. Comparison of Chlorine and Ozone as Virucidal Agents of Poliomyelitis Virus. Proc. Soc. Exp. Biol. Med. 53(1): 71–73. 1943.

There are many publications that disclose the benefits of treating water with ozone. To summarize, these publications disclose that ozone treatment systems in general are capable of removing the following undesirable substances from water: organics, heavy metals such as manganese, pathogens such as virus, spors, fungii, mercaptans and *E. coli* bacteria, formaldehyde, pesticides, detergent and chlorine and halogenated hydrocarbons.

The conventional method of dissolving ozone in water is to bubble the gaseous ozone upwardly through the water. U.S. Pat. No. 3,699,776 discloses an ozone purifier for a pressurized water cooler wherein gaseous ozone is introduced through a diffuser into a tank containing water. The ozone is allowed to bubble through the water.

U.S. Pat. No. 3,726,404 discloses an apparatus for purifying water wherein a batch of water is contained in a tank and fine bubbles of ozone are allowed to rise through the water. Once the batch of water is treated with a sufficient amount of ozone, the batch is transferred to a storage tank.

U.S. Pat. No. 3,421,999 discloses an ozone generator for purifying contaminated fluid wherein ozone is injected through an aspirator into a stream of contaminated fluid. The mixture of ozone and fluid is then immediately discharged into a pipeline which directs the fluid to storage.

U.S. Pat. No. 3,692,180 discloses a water purifier wherein ozone is fed to the bottom of a container. A diffuser breaks the ozone into small bubbles that rise through the water in the container.

U.S. Pat. No. 2,970,821 discloses a water treatment system wherein ozone is introduced directly into a water line through an injector. Immediately after the injection of ozone the water is added to a mixing vessel wherein the ozone and water are mixed and the water treated.

The above-mentioned patents disclose systems wherein ozone is bubbled through water. Although a portion of the ozone is dissolved in the water, the dissolution rate of ozone into the water is very low because of the generally low partial pressure of ozone in the water. Thus, the treatment time is extended, and, when the ozone bubbles reach the surface of the water, the bubbles burst and a large amount of undissolved ozone is wasted.

One object of the invention is to provide a water treatment system wherein purified water may be continuously produced.

Another object of the invention is to provide a system which provides for large amounts of ozone to be dissolved into water.

Another object of the invention is to contact the water with ozone bubbles for relatively long periods of time to provide for dissolution of the ozone into the water.

SUMMARY OF THE INVENTION

The invention provides an apparatus and a method for purifying liquids such as water. The apparatus comprises an ozone generator which produces ozone from oxygen in the air which is fed into the ozone generator. The gas containing ozone is mixed with the liquid to be purified in an aspirator which provides for a liquid and ozone mixture. The mixture is then circulated through an elongated treatment conduit of sufficient length to allow for the ozone and liquid to remain in contact for a sufficient amount of time to dissolve ozone in the liquid and purify the liquid. The length and diameter of the elongated treatment conduit will be chosen so that the ozone and the liquid in the mixture remain in contact for a sufficient amount of time to dissolve ozone in the liquid and purify the liquid. In the preferred embodiment the elongated treatment conduit is at least about 10 feet long, most preferably between about 20 and about 50 feet. It is preferred that the inner diameter of the elongated treatment conduit be less than about 1 inch, most preferably about ½ inch. It is preferred that the liquid and ozone mixture be circulated through the elongated treatment conduit under a pressure in excess of atmospheric pressure, preferably in excess of two atmospheres. The ozone generator of the present invention uses air as a feed gas and provides a gas having an unusually high ozone concentration, that is an ozone concentration of at least about 1.2 weight percent, and, preferably approaching two weight percent ozone. The ozone generator comprises a plurality of electrodes connected in series by air flow lines, wherein the first electrode tends to excite the oxygen in the air and produce ozone. The ozonated air from the first electrode is transported to a second electrode wherein the second electrode produces a gas having an unexpectedly high concentration of ozone. The ozone generator which comprises a plurality of electrodes connected in series allows for the production of a relatively high flow rate of ozone.

Thus, if desired, the fluid can be circulated continuously through the elongated treatment conduit to produce a purified fluid. This is a particularly important feature wherein the fluid to be purified is water in that prior known treatment apparatus which treat water with ozone work on the batch principle.

With the mixture of ozone and fluid being circulated under pressure through the elongated treatment conduit, relatively high amounts of ozone are dissolved into the fluid. This is particularly the case because in a preferred embodiment of the invention, the novel ozonator produces a gas having a relatively high concentration of ozone.

It should be understood that the length and diameter of the fluid conduit will be chosen based on factors including the types of impurities which are to be removed from the liquid and the concentrations of the impurities in the liquid. Thus, in the method of purifying the liquid, it is initially necessary to chose an elongated treatment conduit having sufficient length and diameter to allow the ozone to contact the liquid for a sufficient amount of time to allow the ozone to dissolve into the liquid and to purify the liquid.

DETAILED DESCRIPTION OF THE INVENTION

Figure 1:
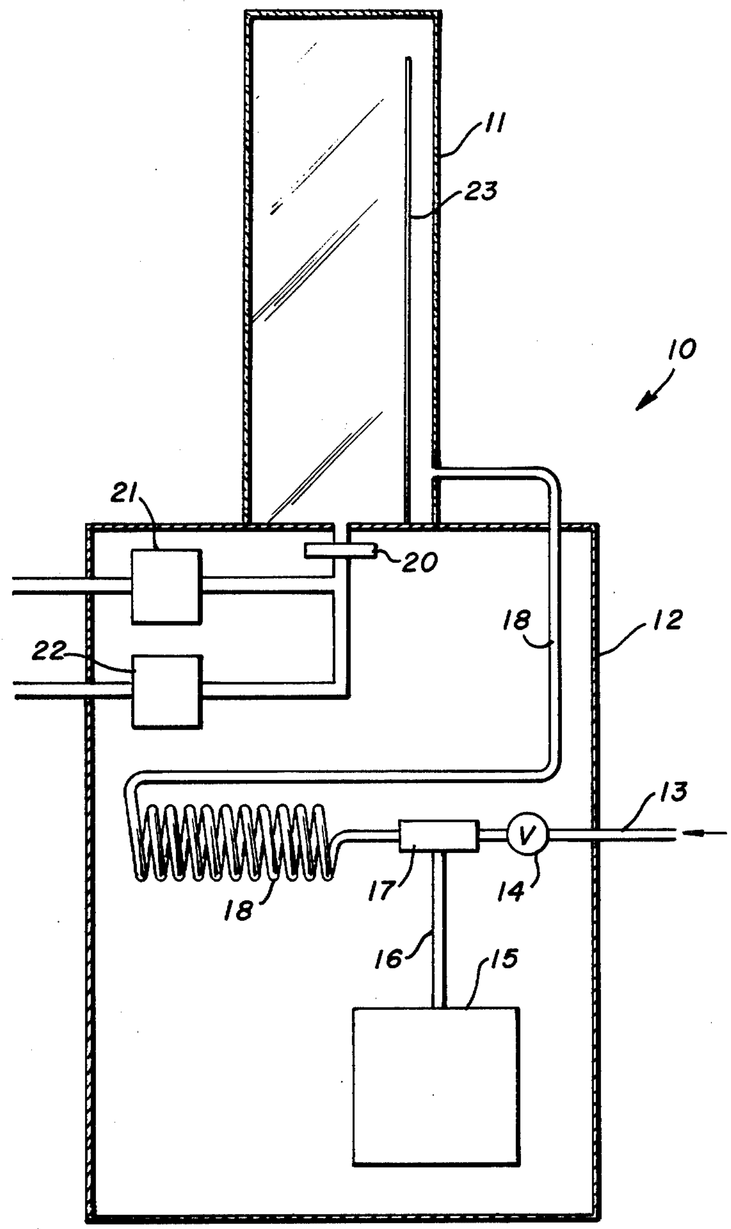
FIG. 1 is a schematic diagram of the water treatment system.

Referring to FIG. 1, which is a schematic diagram of a preferred embodiment of the present invention, the water treatment apparatus is shown generally at 10 and includes container 11 for the water which has been treated. Container 11 preferably has a cylindrical shape, comprises transparent glass or plastic and is positioned above cabinet 12 which contains the essential water treatment parts. Untreated water is delivered to water treatment apparatus 10 through conduit 13. The inflow of water through conduit 13 is controlled by solenoid valve 14. A second solenoid valve is built-in ozonator 15 to protect ozonator 15 from seepage of water into the ozone electrodes when the apparatus is not functioning. Ozone gas is provided by ozonator 15 which is preferably an ozonator of the type which will be described in detail hereinafter in the discussion of FIGS. 5, 6 and 7. Ozone conduit 16 allows for passage of the ozone gas provided by the ozonator to an aspirator 17 which mixes the ozone gas with the untreated water. The aspirator 17 separates the ozone gas flow into tiny microbubbles and mixes these microbubbles with the untreated water. The water which is circulated through conduit 13 to aspirator 17 is under a pressure in excess of atmospheric pressure and forces the ozone gas and water mixture through elongated treatment conduit 18 which is preferably coiled to provide a compact water treatment system. During circulating through elongated treatment conduit 18 the water is treated and is then delivered through elongated treatment conduit 18 to water storage container 11.

The elongated treatment conduit 18 is a particularly important aspect of the present invention. The function of elongated treatment conduit 18 will be described with respect to FIGS. 2, 3 and 4 which show an expanded section of the elongated treatconduit 18 including the flow of the gaseous ozone and water mixture therethrough.

Figure 2:
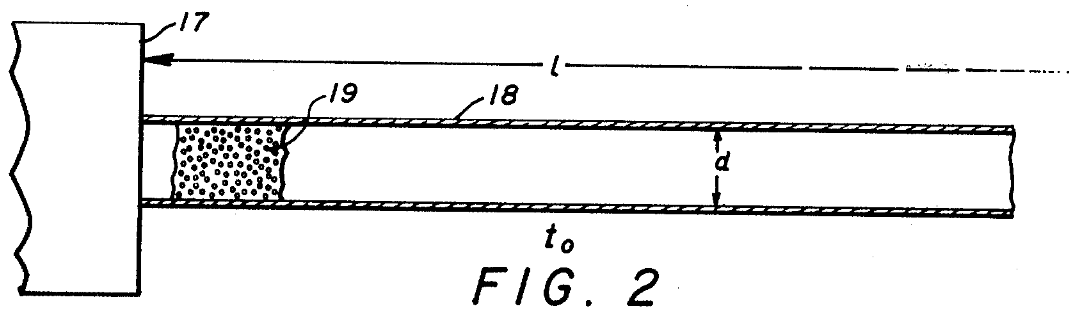
FIG. 2 is an expanded view of the first portion of the elongated treatment conduit shown in FIG. 1.

It should be understood that ozone is a gas that is soluble in water. Referring to FIG. 2, when the gaseous ozone and water mixture is discharged from aspirator 17 and first enters elongated treatment conduit 18, little or no gaseous ozone has dissolved in the water, but rather there is a distinct phase difference between the gaseous ozone and the water. The ability of ozone to purify water is a function of the amount of ozone dissolved in the water rather than the amount of gaseous ozone present as discrete bubbles in the water. Since the amount of ozone that dissolves in a defined amount of water at a given temperature is very nearly proportional to the partial pressure of the ozone, it is desirable to circulate the water through the elongated treatment conduit 18 under a pressure which is in excess of atmospheric pressure. It is preferred that the water treatment apparatus be designed to purify not only water of average purity but also very impure water. Thus, in the design of water treatment apparatus 10 there are important parameters which must be met. Such parameters include the length, l, of elongated treatment conduit 18, the inner diameter, d, of elongated treatment conduit 18, the pressure of the ozone gas and water mixture introduced into elongated treatment conduit 18, the volume flow rate of the ozone and water mixture circulated through elongated treatment conduit 18, the weight percent of ozone in the gaseous ozone and water mixture, the weight percent of ozone in the gas mixed with the water, the size of the microbubbles of gas containing ozone, and the temperature of the water and ozone mixture.

Figure 3:
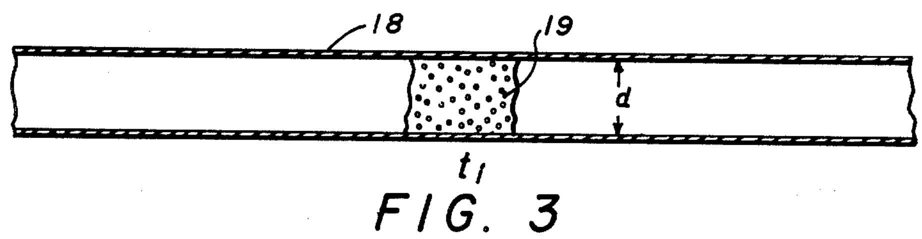
FIG. 3 is an expanded view of the intermediate portion of the elongated treatment conduit shown in FIG. 1.
Figure 4:
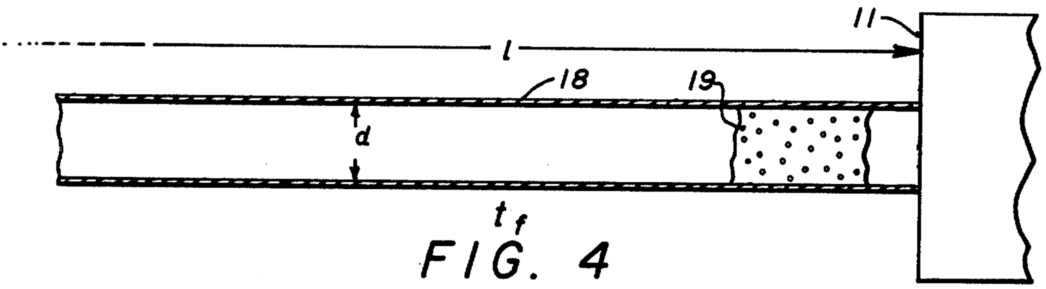
FIG. 4 is an expanded view of the final portion of the elongated treatment conduit shown in FIG. 1.

FIGS. 2, 3 and 4 illustrate the method by which the untreated water is purified by the water treatment apparatus of the present invention. FIG. 2 shows the aspirator 17 and the portion of elongated treatment conduit 18 immediately downstream of the aspirator 17. Although it should be understood that the flow through elongated treatment conduit is continuous, FIG. 2 shows a discrete portion 19 of the water and gaseous mixture. The length, l, of elongated treatment conduit 18 is measured from the aspirator to the end of elongated treatment conduit 18. Although it is preferred that elongated treatment conduit have a constant diameter, treatment conduits which have diameters which vary along the length of the conduit may be used, so long as the mean diameter is relatively small. As shown in FIG. 2, the gaseous ozone and air mixture is ejected from aspirator 17 into elongated treatment conduit 18 at time $t_o$. At time $t_o$, substantially all of the ozone is in the gaseous form and very little of the ozone has been dissolved into the water. The gaseous ozone is soluble in water and dissolves in the discrete amount of liquid at a rate proportional to the pressure of the gaseous ozone and water mixture. Referring to FIG. 3, as the discrete portion 19 flows through the elongated treatment conduit under pressure, the soluble ozone gas dissolves into discrete portion 19 and the dissolved ozone begins to oxidize impurities in the water. As the water proceeds through elongated treatment conduit 18, discrete portion 19 at intermediate time $t_i$, that is, a time at which discrete portion 19 is somewhere between aspirator 17 and container 11, ozone is continually being dissolved into the water. It should be understood that during movement of discrete portion 19 through elongated treatment conduit 18, an equilibrium between the gaseous ozone and the dissolved ozone is not reached because as the ozone is dissolved into the water it is consumed in the oxidation process in which impurities are oxidized and oxygen is liberated.

As shown in FIG. 4, as discrete portion 19 of water reaches the end of elongated treatment conduit 18, a substantial portion of the ozone has been consumed during the movement of the discrete portion through elongated treatment conduit 18. At the final stages of the treatment process, at time $t_f$, treatment of the water is finished and purified water having relatively high amounts of dissolved and gaseous oxygen is provided. Although some purification may occur in container 11, a large portion of the purification occurs in elongated treatment conduit 18 because the liquid in the conduit is under pressure. When the liquid in the conduit is released into container 11, the pressure of the water approaches atmospheric pressure and the dissolution of any remaining ozone gas into the water occurs at a low rate.

In order to obtain desired dissolution rates of ozone into the water, it is desirable that the pressure of the mixture within the elongated treatment conduit be substantially above atmospheric pressure. It is particularly preferred that the pressure within the conduit be in excess of two atmospheres. The upper limitation on the pressure of the mixture within elongated treatment conduit 18 is the maximum pressure the conduit can withstand. In general, the pressure within elongated treatment conduit 18 is limited by the pressure of the source of water, and it has been found that many domestic sources provide water having water pressures in excess of the proscribed minimum.

In order to insure intimate contact of the gaseous ozone microbubbles with the water, it is preferable to provide an elongated treatment conduit having a relatively small inner diameter, that is, an inner diameter less than about 1 inch. The lower limit on the inner diameter of the fluid conduit is limited by the desired volume flow rate. A particularly preferred inner diameter for the fluid conduit 18 is about ½ inch.

Another important parameter of the process is the length of elongated treatment conduit 18. While the length will depend upon the other parameters of the system, the length depends most heavily on the degree of impurity of the water. In order to achieve sufficient dissolution of the ozone in the water, it is preferable to provide an elongated treatment conduit of a length of at least 10 feet. In areas where there are particularly high amounts of impurities in the water, such as in cities, the length of the elongated treatment conduit can be anywhere from about 20 to about 50 feet and most preferably from about 25 to about 40 feet. However, it should be understood that there is really no upper limitation on the length of elongated treatment conduit 18, although, at lengths above about 50 feet little additional purification is achieved.

Another important parameter of the present invention is the volume flow rate. Although the volume flow rate is a function of some of the previously mentioned parameters such as water pressure and treatment conduit length and diameter, the flow rate is also a function of viscosity and liquid to wall friction. It is generally preferred that the volume flow rate be within the range of about 2 to about 5 gallons per minute.

It should be understood that the ozonator of the present invention converts oxygen in air to ozone so that the gas provided at aspirator 17 is a mixture of ozone plus other gases. It is preferred that the weight percent of ozone in the gas introduced into the aspirator be as high as possible. A preferred weight percent range for ozone in a gas is at least about 1.2% to 2%.

It is desirable to minimize the size of the gaseous microbubbles mixed with the water at the aspirator so as to provide maximum surface area for dissolution of the gaseous ozone into the water. It is particularly preferred that the average diameter of the microbubbles be within the range of about 10 microns to about 20 microns.

Referring back to FIG. 1, treated water is delivered from elongated treatment conduit 18 into container 11 and is available for any use. Water treatment apparatus 10 may be provided with an activated carbon filter 20 to remove impurities including particulate matter from the ozone treated water. Although it is preferred that activated carbon filter 20 be located downstream of the container 11, it should be understood that the activated carbon filter can be placed immediately downstream of elongated treatment conduit 18 to filter the water prior to storage in container 11. Optionally, water treatment apparatus 10 may also include conventional water heating and/or cooling devices, respectively indicated at 21 and 22, which provide heated or cooled water.

Water treatment apparatus 10 is provided with a control system which allows for replenishment of treated water in container 11 as the treated water is consumed. Container 11 is provided with a water level sensor 23 which senses the level of the water in container 11 and signals the control system to allow opening of valve 14 and ignition of ozonator 15 to provide flow of ozone when a predetermined low level is reached. When container 11 is filled to a predetermined level, the control system closes valve 14 and terminates the production of ozone.

In treating waters contaminated by organics, bacteria, virus, heavy metals such as iron or manganese or traces of industrial contaminates such as phenols, formaldehyde, pesticides and other chemical complexes, for maximum treatment by ozone, a high concentration of ozone in the ozonized air is essential. Existing ozone generators under operating conditions deliver a maximum of about 1 weight percent ozone concentration when air is used as the feed gas. When pure oxygen is used as the feed gas, existing ozonators provide a gas having about 2 weight percent ozone. However, to supply pure oxygen for domestic use or for other uses to which the invention of this application can be used, is not very practical, and, if oxygen is used, the apparatus and process would be very costly.

With gases having 1 weight percent ozone concentration, only partial purification of the water takes place. However, it has been found that a gas having at least a 1.2 weight percent ozone concentration and preferably about a 2 weight percent ozone concentration provides for excellent purification. To provide a gas having 2 weight percent ozone, a novel type of ozone generator is used.

Figure 5:
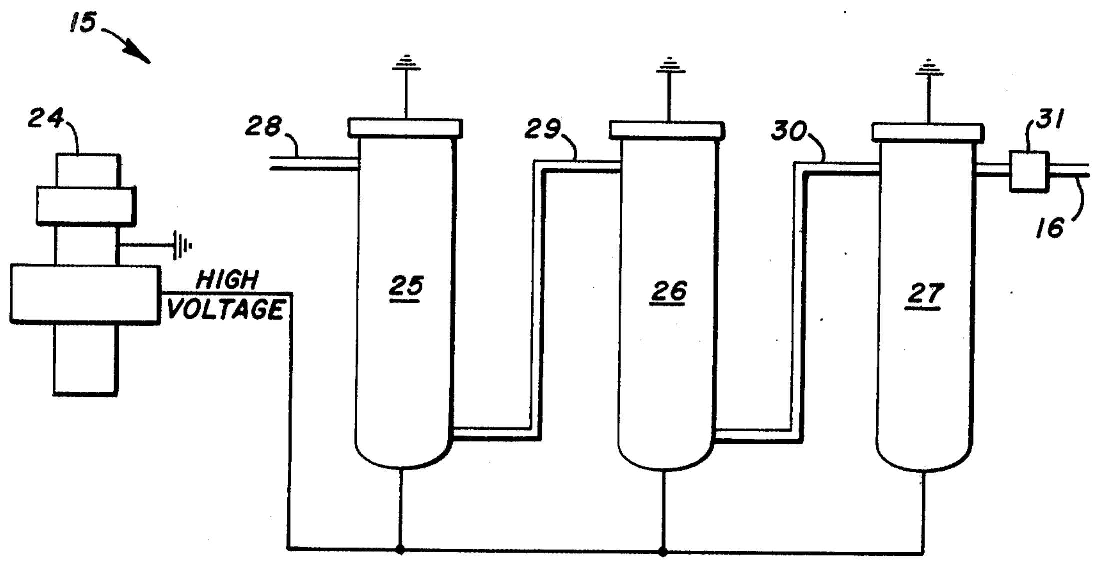
FIG. 5 is a perspective view of the ozonator including a step-up transformer with a high voltage secondary and ozone producing electrodes.

Contrary to known ozone generators where ozone is produced in a single set of electrodes, in the present invention ozone is produced in two or more electrodes aligned in series. FIG. 5 shows an expanded schematic view of an ozonator which may be used in the present invention. Ozonator shown generally at 15 comprises stepup transformer 24 having a high voltage secondary and electrodes 25, 26 and optionally 27 which are connected in series by air flow passages 28, 29 and 30. As a result of the above-described structure, the first electrode can produce 100 milligrams of ozone per hour. The air and ozone mixture which leaves electrode 25 through flow line 29 is then subjected to a second processing in second electrode 26. When the ozone leaves the second electrode 26, the production of ozone will exceed 200 milligrams per hour, and will approach approximately 40% more than the expected output, or 280 milligrams per hour. Optionally, when the third electrode 27 is used, the ozone production will not be 300 milligrams per hour, but rather, as much as approximately 70% more, or 510 milligrams of ozone per hour. The gas produced through line 16 has an ozone concentration in excess of about 1.2 weight percent and generally has an ozone concentration of about 2 weight percent. Ozone in a concentration of 2 weight percent is 2 to 3 times more powerful for oxidation and purification purposes than a gas having a 1 weight percent concentration. Whether two, three or even more electrodes are hooked in series will depend upon the size of the ozone generator to be used and the desired flow rates and concentrations of the ozone. In the case of domestic ozone equipment, three electrodes may be used. In a large industrial ozone generator operating at a 9,000 volt secondary voltage and 100 Hz frequency, the intensity and heat inside the corona discharge chamber may be such that the ozone produced in the first two electrodes may be decomposed in the third electrode. In this instance only two electrodes will be used.

As shown in FIG. 5, solenoid valve 31 prevents water from seeping back into the electrodes.

Figure 6:
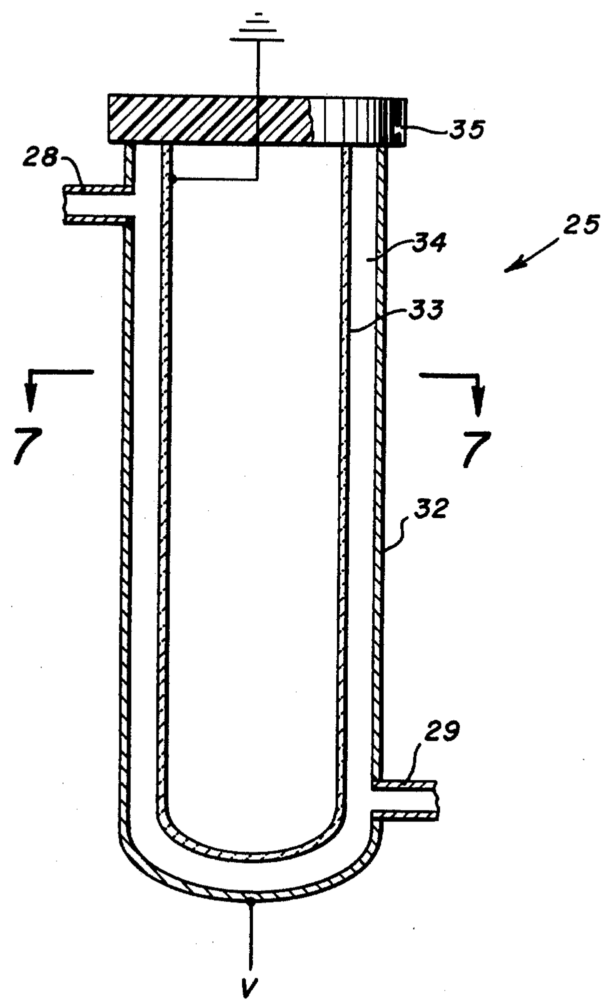
FIG. 6 is the perspective view of a single ozone producing electrode.
Figure 7:
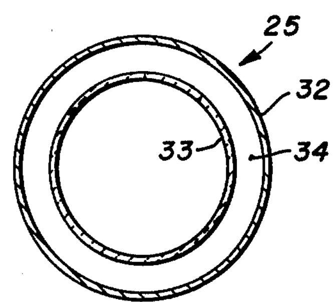
FIG. 7 is a plan sectional view along line 7—7 of FIG. 6 of the ozone producing electrode.

Referring to FIGS. 6 and 7, these FIGURES show an expanded view of a single electrode, for example, electrode 25. Electrode 25 includes an outside cylindrical casing 32 made of for example high purity aluminum, such as, for example, aluminum having technical number 1100H14. Extending into the interior of casing 32 are flow lines 28 and 29. Spaced inwardly from casing 32 is a cylindrically shaped glass or ceramic dielectric material 33 to provide an airflow and corona discharge gap 34. High voltage line V is connected to the aluminum casing 33 and the ground line is connected to the dielectric material 33. Cover 35 closes the top of air passage 34 and supports casing 32 and dielectric material 33.

During the operation of ozonator 15, air is delivered through flow line 28 to electrode 25 where the oxygen molecules in the air are excited and a small amount of ozone is produced. This ozonated air is delivered through flow line 29 to electrode 26 wherein the gas is subjected to further corona discharges and additional ozone is produced. The ozonated air can then be either led to electrode 27 through flow line 30 or can be used in the purification of water after the air has been subjected to two electrodes.

Although it is preferred to use cylindrical electrodes in the production of ozone, it should be understood that any configuration of electrodes can be used such as, for example, plate electrodes.

It should be understood that the voltage in an ozonator for use in domestic water apparatus is provided by a step up transformer with a high secondary voltage. In larger units, the power is modulated by means of solid state circuitry, high voltage transformers, DC inverters and electrodes made out of ceramic or other high strength dielectric material. In each instance, as should be understood by one skilled in the art, the modulated electrical power is designed to suit the requirements of the particular ozone producing electrode.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An apparatus for purifying water comprising:

a first ozone generator, said first ozone generator including a pair of spacially displaced electrodes and means for creating an ionizing electrostatic field between said electrodes, said electrodes defining a passage for the flow of gas through said first ozone generator;

at least a second ozone generator, said second ozone generator including a pair of spacially displaced electrodes and means for creating an ionizing electrostatic field between said electrodes, said electrodes of said second ozone generator defining a passage for the flow of gas through said second ozone generator;

means connecting the gas flow passages of said first and second ozone generators in a series, said connecting means comprising a conduit;

means for delivering air to a first end of the gas flow passage of said first ozone generator whereby a corona discharge will be established in said first ozone generator and the air will be partially ozonated, the ozone concentration in the air thereafter being increased in said second ozone generator to a percent by weight of the air exiting said second ozone generator exceeding 1.2%;

a fluid treatment conduit, said fluid treatment conduit being partially in the form of a spiral and having a length of at least 10 feet, said fluid treatment conduit having an inner diameter of less than 1 inch and being free of turbulence promoting irregularities;

means for supplying water to be purified to a first end of said fluid treatment conduit under a pressure of at least two atmospheres;

means for producing and causing entrainment of microbubbles in the water flowing through said fluid treatment conduit, said microbubbles having an average diameter in the range of 10 to 20 microns and being uniformly dispersed in the water, said entrainment causing means being located adjacent the first end of said conduit;

means for delivering the ozonated air exiting the gas flow passage of said second ozone generator as the supply gas to said entrainment causing means whereby the microbubbles entrained in the water include ozone molecules; and storage tank means, said storage tank means being connected to the discharge end of said fluid treatment conduit.

2. The apparatus of claim 1 further comprising:

activated carbon filter means for filtering water withdrawn from said storage tank means.

3. The apparatus of claim 1 further comprising:

means for sensing the level of liquid in said storage tank means;

means for deenergizing the field creating means of said first and second ozone generators when the level of water in said storage tank means exceeds a predetermined level; and means for discontinuing the supply of water to said apparatus when the level of water in said storage tank means exceeds the predetermined level.

4. The apparatus of claim 1 further comprising:

means for cooling water withdrawn from said storage tank means.

5. The apparatus of claim 4 further comprising:

activated carbon filter means for filtering water withdrawn from said storage tank means.

6. The apparatus of claim 5 further comprising:

heater means for heating water withdrawn from said storage tank means.

7. A method for the purification of water comprising:

establishing a corona discharge in an air stream to partially ionize the air and generate ozone molecules;

establishing a second corona discharge in the stream of partially ionized air to increase the percent by weight of ozone in the air stream to an amount exceeding 1.2%, the sequential subjection of the air stream to the first and second corona discharges being spaced in time;

dividing the ionized air stream into microbubbles having an average diameter of from 10 to 20 microns;

entraining the microbubles in a stream of water to be purified;

maintaining a hydraulic pressure of at least two atmospheres in said stream of water while causing the stream to travel along a spiral path for a distance of at least ten feet while the ozone molecules are dissolved therein; and collecting the water stream in a storage container.

* * * * *